(No Model.)
E. A. GIESELER.
CURVE SCRIBER.
No. 390,360. Patented Oct. 2, 1888.
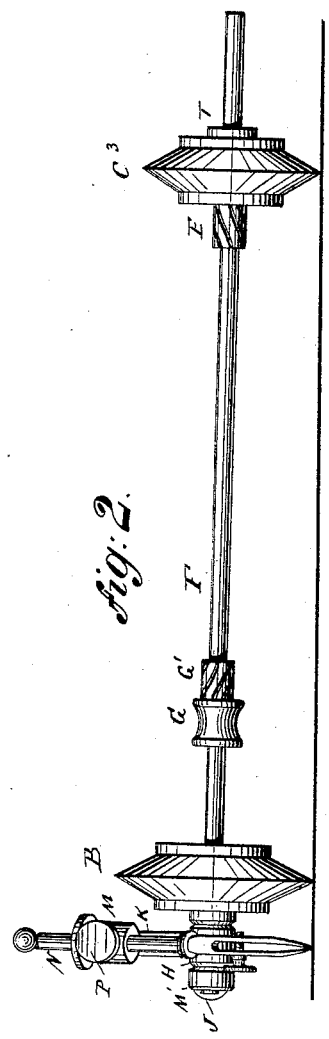
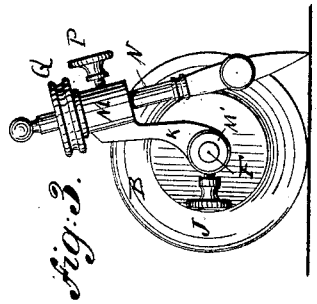
WITNESSES:
A. Schehl.
Carl Kay
INVENTOR
Ernst A. Gieseler
BY
ATTORNEYS.

UNITED STATES PATENT OFFICE.

ERNST A. GIESELER, OF HOBOKEN, NEW JERSEY.

CURVE-SCRIBER.

SPECIFICATION forming part of Letters Patent No. 390,360, dated October 2, 1888.

Application filed December 20, 1887. Serial No. 258,444. (No model.)

*To all whom it may concern:*

Be it known that I, ERNST A. GIESELER, of Hoboken, in the county of Hudson and State of New Jersey, have invented certain new and useful Improvements in Instruments for Scribing Arcs and Circles, of which the following is a specification.

The object of my invention is to provide a new and improved instrument for scribing arcs and circles, more especially arcs of large diameter.

The invention consists in an instrument for scribing arcs of circles, composed of an axle and a fixed and an adjustable wheel thereon, said wheels having different diameters.

The invention further consists in the combination, with said curvograph, of a pen or pencil-holder supported by the axle adjacent to the fixed wheel.

The invention also consists in the construction and combination of parts and details, as will be found fully described and set forth hereinafter, and then pointed out in the claims.

In the accompanying drawings, Figure 1 is a diagrammatical view representing the frustum of a cone. Fig. 2 is a longitudinal elevation of my improved curvograph. Fig. 3 is an end view of the same. Fig. 4 is a side view of the pencil-holding device to be used on the same. Figs. 5, 6, 7, and 8 are detail edge views of the different wheels or rollers. Fig. 9 is a perspective view of the scale.

Similar letters of reference indicate corresponding parts.

The principle upon which my improved instrument is based is the following: If the frustum of a cone is placed upon a plane and a rolling motion is imparted to it, every point of the conical surface describes a circle on such plane, the radius of each circle being equal to the distance at which the point describing it is from the apex of the cone, the frustum of which has been set in rolling motion. The same result is obtained if two wheels of different diameters mounted centrally on different parts of an axle are used in place of the frustum of the cone, and if one of the wheels is so arranged that it can be shifted on the axle nearer to or farther away from the other, then the height of the cone determined by the two wheels will be more or less, according to whether the wheels are put closer together or farther away from each other, and consequently the radius of the circle described by the larger wheel will become smaller or larger, accordingly as the distance between the two wheels is smaller or larger.

Let R and $r$ in Fig. 1 represent the radii of the two wheels, D the distance between the two wheels measured on the axle on which said wheels are to turn, L representing the distance of any point of the circumference of the larger wheel from the apex A of a cone, the frustum of which would be bounded at the top and bottom by the wheels having the radii R and $r$, and let $a$ represent the angle under which the axis is inclined to the horizontal or underlying plane. We then have $L = \dfrac{R}{\text{sine } a}$ and also tangent $a = \dfrac{R-r}{D}$. For small values of $a$ the tangent may be substituted for the sine without an appreciable error, and by doing so we have:

$$L = \frac{R}{\frac{R-r}{D}} = \frac{R\,D}{R-r} = \frac{1}{R-r} R\,D. \quad (1.)$$

According to this equation the radius of the circle described by the larger wheel is determined from the radii of the two wheels and their distance from each other as measured on the axle. A graduation can therefore be accomplished from this equation, which, when it is engraved on the axis or on a separate scale, at once shows where to set the smaller wheel in order to describe a circle of a desired radius.

In order to enlarge the scope of the instrument, I intend to use various small wheels with one and the same large wheel, and I further intend to choose the dimensions of the wheels so that one and the same graduation or scale will answer for all of them. According to equation 1, this can be done by increasing the distance between the radii of the smaller wheels and the radius of the large fixed wheel in the same proportion which the largest value of D bears to its smallest value. For example, let us assume that the greatest value of D—the distance between the larger and the smaller wheel—be equal to six inches and its smallest value three inches. The proportion between them is equal to two, and the difference between the radii of the smaller wheels must increase in this ratio in order to secure the desired object. If the diameter of the larger wheel is one and one half inch and the diameter of the next smallest wheel is one and eleven twenty-fourths, then the difference between the two radii is one forty-eighth of an inch. The difference between the next smaller wheel and the large wheel will then be one twenty-fourth of an inch, the next one-twelfth, and so on. If now the three inches of the axle over which the smaller wheels are graduated into one hundred and eight parts, the same being numbered from 216 to 108, or a separate scale can be graduated, then for the first small wheel—that is, the next largest—each graduation will signify in inches the radius of the circle which is obtained when the next largest wheel is set for said graduation. For the second small wheel each figure must be divided by two, for the third wheel by four, for the fourth wheel by eight, for the fifth wheel by sixteen, and so forth in order to obtain in inches the radius of the circle.

In the drawings, B represents the largest wheel, which is fixed on the axle F near one end of the same. $C^2$, $C^3$, $C^4$, and $C^5$ represent the smaller wheels, which gradually decrease in size, and are provided at the center with a spring-sleeve, E, for holding them in place on the axle. In order to insure a true rolling motion of the wheels, it is necessary that at the circumference they should either be provided with a knife-edge or beveled or rounded, so that the contact of the said circumference with the paper will be as nearly as practicable a mathematical point.

On the axle F is mounted a grooved collar, G, also provided with a spring-sleeve, G', for holding it in place on the shaft, which collar does not turn on but with the axle. The spring-sleeves E and G' of the wheels and collar, respectively, are made of sheet metal and provided with straight or spiral slits, so as to form a series of spring-prongs. On that part of the axle projecting beyond the outer side of the larger wheel, B, a sleeve, H, is mounted, in which the axle can turn freely. Said sleeve is prevented from slipping off the end of the axle by a collar, M', that is held on the axle by a binding-screw, J. Said sleeve H is provided with an arm, K, carrying at its outer end the sleeve M, through which the drawing-pen N or pencil-holder O can be passed and locked in place by means of the binding-screw P. As it sometimes occurs that the pencil or pen has not sufficient weight to properly trace the line on the paper, I increase the weight acting on said pen or pencil holder by placing weights Q, having central apertures, through which the upper ends of the pen or pencil holder can be passed, upon the top of the sleeve M. The pen or pencil held in the manner described traces a line on the paper adjacent to and concentric with the track of the wheel B; but the circle described by the pen or pencil is too large by the distance that the pen or pencil point is situated from the plane of the wheel B. To compensate for this I provide the smaller wheels, $C^2$ $C^3$ $C^4$, &c., with shoulders T on the outer sides, said shoulders increasing in length, the wheel $C^2$ having the smallest and the wheel $C^5$ the longest shoulder.

The instrument is adjusted according to the diameter of the circle to be described by placing one of the smaller wheels, $C^2$ $C^3$ $C^4$, &c., on the free end of the axle F and adjusting said wheel at a greater or less distance from the free end of the shaft by means of the scale S. The left-hand end of the scale is placed against the shoulder T of the smaller wheel and said smaller wheel moved toward the large wheel B until the mark on the scale representing the dimension of the radius of the circle is precisely at the end of the axle or a mark on the axle. For example, if the small wheel $C^3$ is used and the circle described by the pencil or pen is to have a radius of one hundred inches, the wheel $C^3$ is so adjusted on the axle that when the left-hand end of the scale S rests against the shoulder T of said wheel $C^3$ the mark 200 on the scale will be at the end of the axle. As for the second smaller wheel the numeral on the scale must be divided by two to obtain the desired circle.

Motion is imparted to the instrument by pressing lightly with a polished steel rod on the grooved collar G, which is also polished. Said collar should at all times be located nearer the large than the smaller wheel.

For finer-grade instruments I intend to use a pusher, which is a copy on a small scale of the above-described instrument.

The circumferential edges of the wheels may be milled or finely serrated, in order to eliminate any sliding motion, and thus to insure greater stability and safety in the operation of the instrument.

The large wheel may be used for tracing the circle, and for this purpose may be constructed as a toothed wheel with a small grooved wheel above it, which contains and furnishes to the large wheel the requisite quantity of ink.

Having thus described my invention, I claim as new and desire to secure by Letters Patent—

1. The combination, with an axle, of a fixed and an adjustable wheel of different diameters on the same, a sleeve on the axle outside of the fixed wheel, an arm on said sleeve, and a sleeve for receiving a pen or pencil holder on the upper end of said arm, substantially as herein shown and described.

2. The combination, with an axle, of a fixed wheel on the same, a pencil or pen holder adjacent to said fixed wheel, and a series of smaller removable wheels, each removable wheel being provided on its outer side with a central shoulder, the shoulders of the several wheels being of different lengths, the smallest wheel having the longest shoulder and the largest of said removable wheels the shortest shoulder, substantially as herein shown and described.

3. The combination, with an axle, of a fixed wheel on the same, a series of smaller wheels to be mounted one at a time on the axle to turn with the same, the differences between the radii of the smaller wheels and the radius of the large fixed wheel increasing in the same proportion which the largest value of the distance between the two has to the smallest distance between said wheels, substantially as shown and described.

In testimony that I claim the foregoing as my invention I have signed my name in presence of two subscribing witnesses.

ERNST A. GIESELER.

Witnesses:
OSCAR F. GUNZ,
JOHN A. STRALEY.